United States Patent [19]

Monsigny

[11] Patent Number: 4,685,635
[45] Date of Patent: Aug. 11, 1987

[54] SAFETY BELT WINDER HAVING A CYLINDRICAL BODY

[75] Inventor: Jean Monsigny, Saverne, France

[73] Assignee: Aciers et Outillage Peugeot, Audincourt, France

[21] Appl. No.: 830,028

[22] Filed: Feb. 18, 1986

[30] Foreign Application Priority Data

Feb. 15, 1985 [FR] France .................. 85 02231

[51] Int. Cl.⁴ .................. B60R 22/38; B60R 22/40
[52] U.S. Cl. .................. 242/107.4 A; 242/107.4 B
[58] Field of Search .................. 242/107, 107.4 R-E; 280/806; 297/478

[56] References Cited

U.S. PATENT DOCUMENTS

| | | | |
|---|---|---|---|
| 3,202,379 | 8/1965 | Wrighton et al. | 242/107.4 B |
| 3,244,382 | 4/1966 | Blake | 242/107.4 B |
| 3,421,605 | 1/1969 | Hansen | 242/107.4 B X |
| 4,065,071 | 12/1977 | Holmberg | 242/107.4 B X |
| 4,371,125 | 2/1983 | Andres et al. | 242/107 |

FOREIGN PATENT DOCUMENTS

| | | |
|---|---|---|
| 1935539 | 2/1971 | Fed. Rep. of Germany . |
| 2354951 | 1/1978 | France . |
| 2536661 | 6/1984 | France . |

Primary Examiner—John M. Jillions
Attorney, Agent, or Firm—Sughrue, Mion, Zinn, Macpeak and Seas

[57] ABSTRACT

The safety belt winder comprises a base (1) in which is rotatively mounted a strap-carrying reel (4), a strap-return spring device (28), and safety and locking means for the belt (S) responsive to a sudden pulling force exerted on the belt. The base (1) has a tubular shape and the reel (4) is rotatively mounted inside this base and journalled in end side walls (18, 30) mounted on the base and carrying respectively the return spring device (28) and the safety and locking means (10, 15, 16, 17).

12 Claims, 6 Drawing Figures

SAFETY BELT WINDER HAVING A CYLINDRICAL BODY

The present invention relates to safety belt winders for motor vehicles.

Safety belt winders of this known type usually comprise a mount or base having a generally U-shape between the branches of which a strap-carrying reel is rotatively mounted.

Mounted on each side of the branches of the mount and outside these branches are:
(a) A strap-returning spring device.
(b) The safety and locking systems.

Such an arrangement is not adapted to automatic assembly owing to the existence of many component parts to be assembled through the two ends of the winder and to the lack of support of the shaft of the reel in the course of these operations.

Further, the different volumes of the strap return device and the safety and locking systems makes it necessary to manufacture different winders for mounting on the right or left side of the vehicle.

An object of the invention is to overcome these drawbacks of conventional winders and to provide a safety belt winder which is not only reliable in operation and simple in construction, but lends itself particularly well to an automatic assembly of the parts.

The invention therefore provides a safety belt winder comprising a base in which is rotatively mounted a strap-carrying reel, a strap-return spring device, and safety and locking means for the strap responsive to a sudden pulling force exerted on the strap, in which the base has a tubular shape, the reel being rotatively mounted inside the base and being journalled relative to end side walls mounted on the base, wherein the reel is rotatively mounted in the base at at least one of its ends by rolling elements which are in contact with the inner surface of the base, and the end walls respectively carry the strap-return spring device and the safety and locking means.

A better understanding of the invention will be had from the following description, which is given merely by way of example, with reference to the accompanying drawing, in which.

Figure 1:
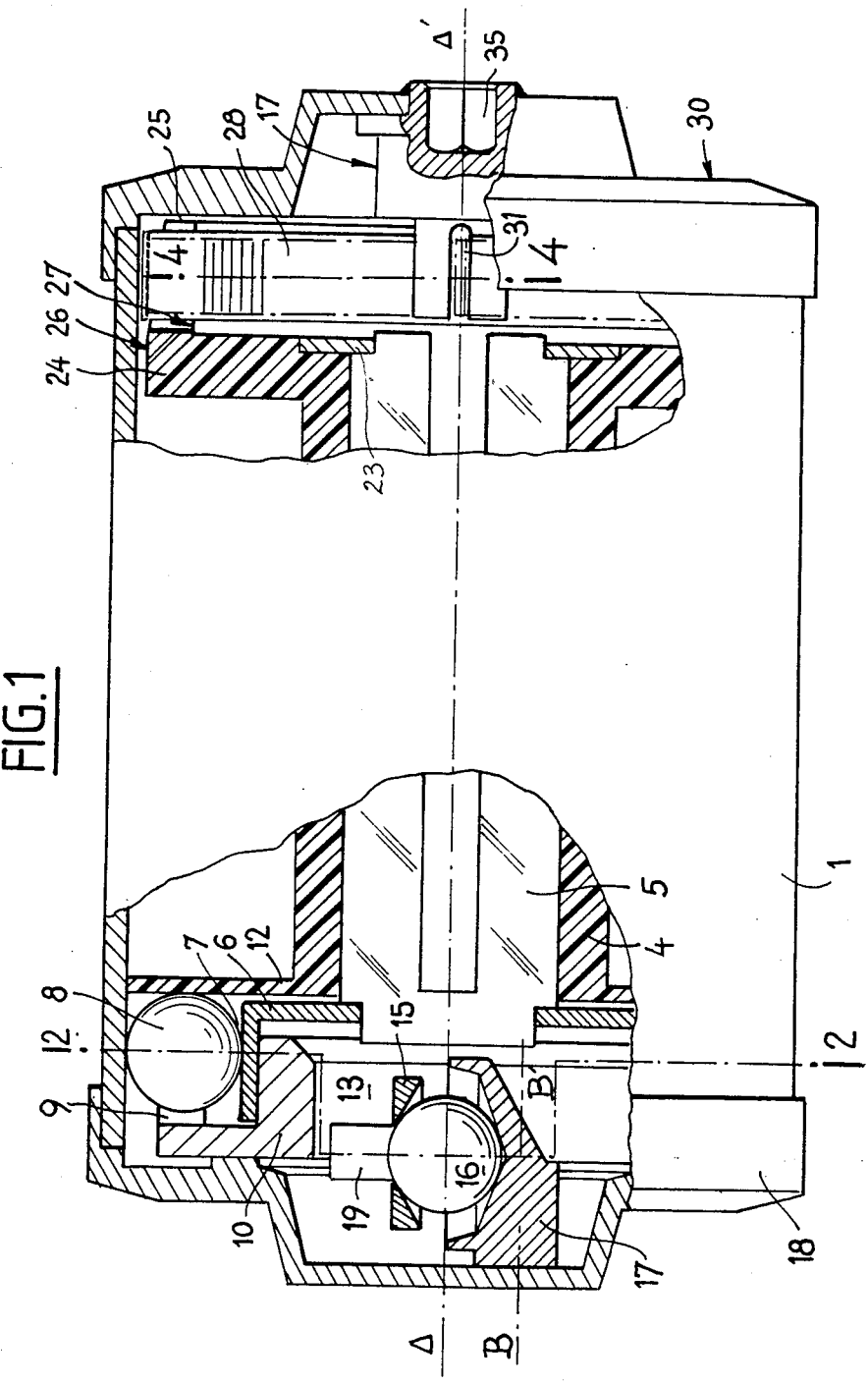
FIG. 1 is an elevational view, with parts cut away, of a safety belt winder according to the invention.

The safety belt winder shown in FIG. 1 has a tubular cylindrical body 1.

Formed in the lateral side of the body 1 is an opening 2 for the passage of the strap.

Figure 3:
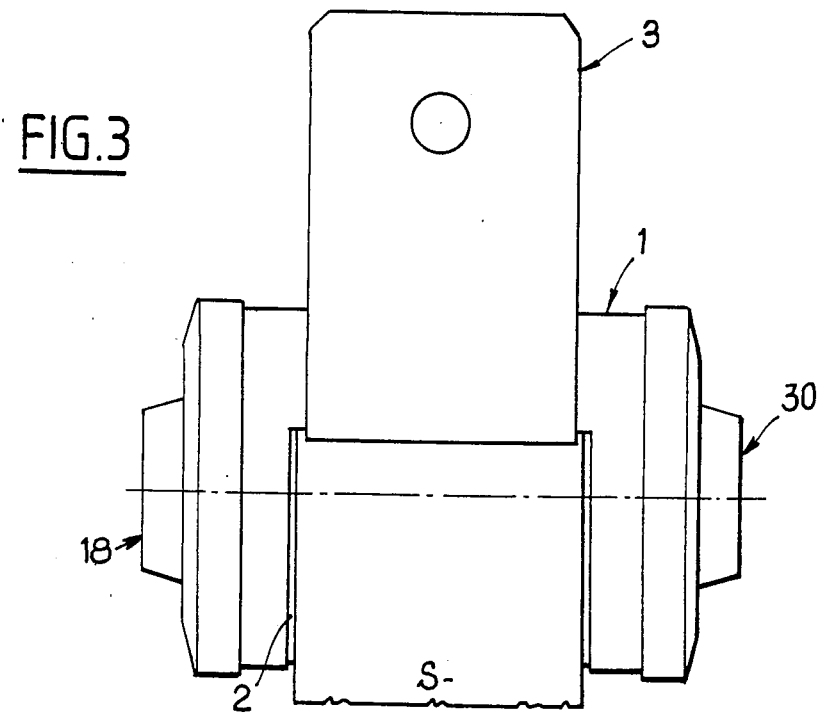
FIG. 3 is an outside elevational view to a reduced scale of the winder according to the invention, showing means for fixing the winder to the vehicle.

The opening 2 is obtained by cutting and bending the material of the body 1 which covered the opening and thus forming a foot 3 for fixing the body (FIG. 3).

Rotatively mounted in the cylindrical body 1 is a strap-carrying reel 4 of, for example, plastics material provided with a stiffening metal insert 5 which is moulded onto or mounted on the reel.

Fixed by a forming-over operation on one of the ends of the insert 5 is a cam 6 constituted by a disc having a lateral ledge 7 defining a cam surface. Interposed between the lateral ledge 7 forming the cam surface and the inner wall of the body 1 are balls or rollers 8 which are advantageously three in number and spaced 120° apart and maintained in their desired positions by a cage 9 which is an integral part of an element 10, the other functions of which will be explained hereinafter.

The element 10 has a generally annular shape and is coaxial with respect to the cylindrical body or base 1.

The cage 9 for the balls 8 is defined by cavities 11 formed in the outer wall of the element 10 (FIG. 2) and opening onto the corresponding end side wall 12 of the reel 4.

Figure 2:
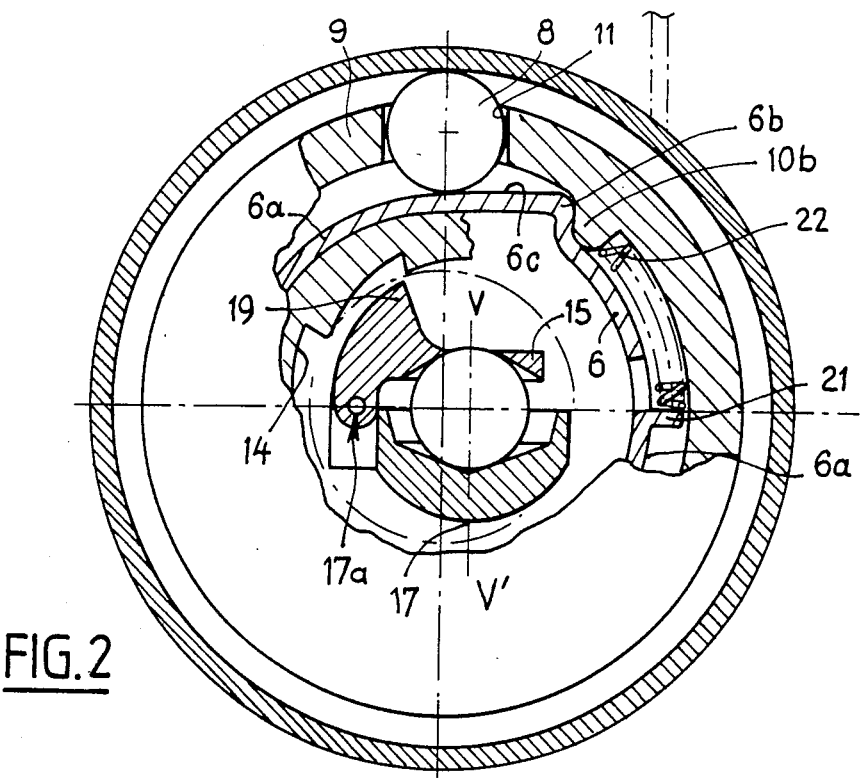
FIG. 2 is a sectional view taken on line 2—2 of FIG. 1.

The element 10 has an inner wall forming an axial cavity on the periphery of which is formed ratchet teeth 14 (FIG. 2).

The ratchet teeth 14 cooperate with a pivotal lever 15 which is movable by a central ball 16 disposed in a seat in the shape of a cup 17 and pivotally mounted on the seat 17 by means of a pin 17a.

The seat 17 is fixed to an end cover 18 which caps the corresponding end of the body 1 and thus defines in the body a compartment for the safety and locking systems.

The assembly comprising the lever 15, the ball 16 and the cup 17 constitutes a deceleration detector whose action is adapted to lock the element 10 against rotation in the event of a sudden deceleration, by displacement of the ball 16 on the inclined walls of the cup 17 which thus causes the raising of the lever 15 and the engagement of a pawl 19 of this lever with a ratchet tooth 14.

The cam 6 has portions 6a which are centered relative to the axis A-A' of the body 1. These portions 6a of the cam 6 are therefore free to rotate in the bore of the body 1 owing to the provision of the balls 8.

Thus, it can be seen that the reel 4 is rotatively mounted at one of its ends by means of the cam 6 directly in the body 1 of the winder.

The element 10 is centered in the cylindrical portions 6a of the cam 6.

Further, the cam 6 includes projecting nose portions 6b which are in contact with inwardly extending projections 10b of the element 10 so as to ensure that the cam 6 drives the element 10 in rotation.

Moreover, the cam 6 has as many ramps 6c as the arrangement has balls 8 or other rolling elements. The ramps 6c are disposed on the other side of the projections 10b of the element 10 relative to the respective nose portions 6b of the cam 6.

Disposed between one of the projections 10b of the element 10 and a corresponding tab 21 of the cam 6 is a coil spring 22 for returning the element 10 to a position in which it is driven by the cam 6.

It will be observed that the mounting of the spring 22 in a plane perpendicular to the axis of assembly of the structure is easy if it is presented in the compressed condition.

Also fixed by a forming-over operation at the end of the stiffening insert 5 opposed to the cam 6 is a driving plate 23 which provides the connection of the reel 4 to the stiffening insert 5 (FIG. 1).

The side wall 24 of the reel 4, to which is fixed the driving plate 23, has an axial flange 25 and a cylindrical outer portion 26 whose diameter is such that a slight clearance exists between this cylindrical portion and the bore of the body 1. The cylindrical portion 26 defines a bearing surface for the journalling of the reel 4 in the body 1. Good results can be obtained from the point of view of friction by judiciously choosing the material of the reel 4 to ensure a good metal-plastics material contact between the bearing surface 26 and the body 1.

The axial flange 25 of the reel 4 defines a space 27 in which a strap-winding spiral spring 28 is disposed.

Thus, the axial flange 25 of the reel 4 constitutes a barrel for the spring 28.

The spring 28 is secured at its center to an element 29 fixed to a second side wall or cover 30 which closes the body 1 of the winder at the end opposed to the side wall 18.

Figure 4:
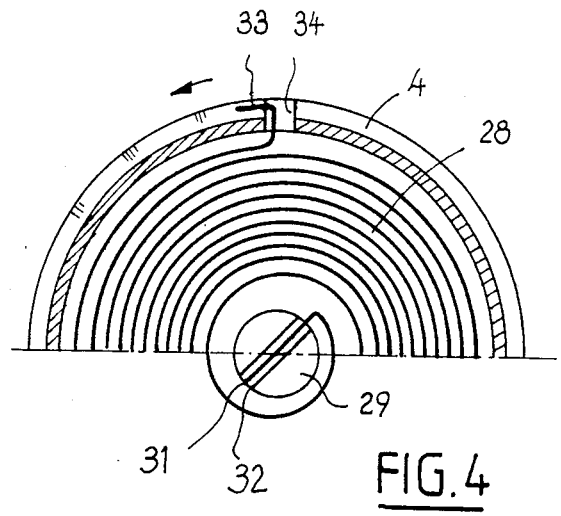
FIG. 4 is a partial sectional view taken on line 4—4 of FIG. 1, of the fixing of the strap-return spring.

The mounting of the spiral spring 28 is shown more clearly in FIG. 4 in which it can seen that the inner end portion 31 of the spring 28 is engaged in a slot 32 formed in the element 29 while its outer end portion 33 is bent and hooked to an edge of a slot 34 provided in the periphery of the reel 4.

The spring 28 can be put under tension by rotating the element 29 which has for this purpose a cavity 35 for driving it in rotation, for example by means of a key.

The locking of the element 29 is achieved by any conventional locking means (not shown).

Thus it can be seen that the arrangement just described differs from that of conventional winders whose spiral spring is hooked from the exterior to a fixed point and whose inner end is connected to the reel.

Figures 5A, 5B:
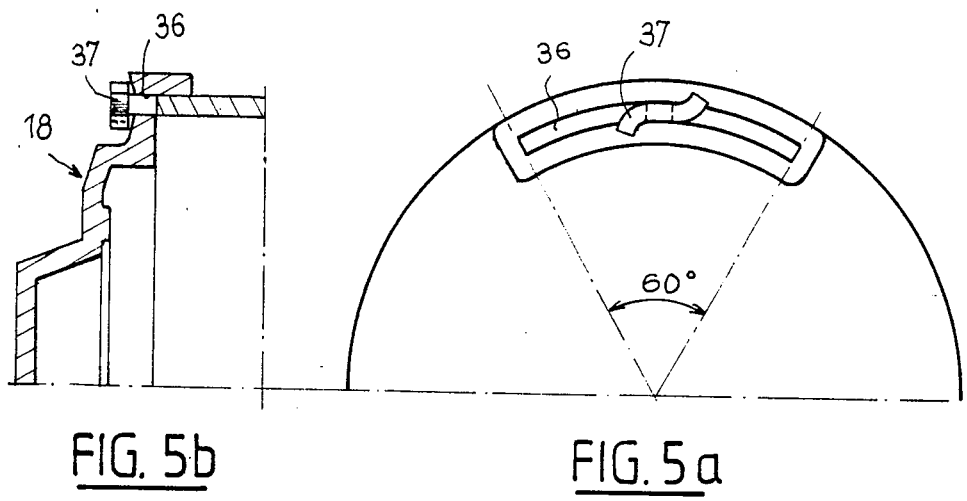
FIGS. 5a and 5b are partial views of details illustrating the manner of fixing the side walls to the base of the winder.

The mounting of the side walls or covers on the body of the winder will now be described with reference to FIGS. 5a and 5b which show the cover 18 closing the compartment of the detecting and locking means.

The cover 18 has three peripheral apertures 36 each extending through 60° around the axis of the reel, said apertures being spaced 120° apart.

The body 1 has three T-shaped fixing tabs 37 also spaced 120° apart.

The cover 18 is mounted by the engagement of the tabs 37 in the apertures 36.

Bearing in mind the angular extent of the apertures 36, it is possible to adjust the angular position of the cover 18 with respect to the body 1 so that the vertical axis of the sudden deceleration detector 15, 16, 17 makes a suitable angle with the mount of the winder.

Having established this angle, the cover 18 is held in position by twisting the tabs 37 (FIG. 5a) so that the twisted portions, in cooperating with undercuts of the cover 18, firmly lock the cover to the body 1 as concerns both rotation and translation.

The cover 30 located at the other end of the body 1 is fixed to the body by similar means.

The winder just described operates in the following manner:

It will first of all be assumed that the strap S is unwound from the reel and normally fixed for holding an occupant of a vehicle on his seat, and that the vehicle is subjected to a sudden deceleration.

This deceleration is immediately detected by the ball 16 (FIG. 2) which moves in the cup 17 which it normally occupies in the center of the latter.

The displacement of the ball 16 causes in the conventional manner the raising of the lever 15 and the engagement of its pawl 19 with a tooth of the ratchet wheel 14. As a result, the element 10 and the balls 8 are prevented from rotating about the axis $\Delta$-$\Delta'$.

The reel 4 continues to be driven in rotation under the effect of the pull exerted by the strap. A relative movement between the element 10 and the cam 6 rigid with the reel 4 occurs so that the ramps 6c of the cam tend to separate the balls 8 by a wedging effect and apply them against the inner wall of the body 1 so that the assembly is locked against rotation. This arrangement, and the choice of the balls or rollers as the rolling elements, have the advantage of reducing the time of response of the safety system as compared to conventional devices having rollers and cavities in which the rollers must find, by an angular displacement, a cavity intended to receive them, which requires an angular displacement before locking and results in a slight unwinding of the strap.

The sensitivity of the system to the movements of the straps is ensured by the coil spring 22 (FIG. 2).

In the case of a energetic or rapid action on the strap S (FIG. 3), and owing to the effects of inertia, the relative displacement between the cam 6 and the element 10 causes the compression of the spring 22 at the same time as the safety jamming between the cam 6 and the body 1 under the action of the balls.

When the action on the strap ceases, the spring 22 extends and returns the element 10 and the cam 6 to their relative position shown in FIG. 2.

The winder according to the invention is adapted to operate in such manner that the vertical axis V-V' (FIG. 2), which determines the position of rest of the inertia-actuated detecting device, has a particular orientation with respect to the foot 3 fixing the winder to the body of the vehicle.

As the same winders are mounted on various vehicles and sometimes in a different manner on the same vehicle, their personalization is characterized by the angle defined hereinbefore.

For this purpose, the seat 17 of the deceleration detector is adjustable in rotation about the axis B-B' of its fastening to the cover 18. Consequently, it is possible to adjust the position of the detector after mounting the winder and thus ensure the personalization of the winder.

The new design of the winder according to the invention permits disposing the strap S in the middle of the winder and equipping the latter with similar end covers 18 and 30 so that the same part can be mounted indifferently on the right or left side of the vehicle.

The winder according to the invention has the further advantage of facilitating the mounting of the strap.

Indeed, in conventional winders, in which the strap take-up spiral spring is hooked by its inner end portion on the shaft of the reel, the spring is armed or stressed under no load, the reel being filled by a false strap after which this false strap is extracted and the shaft is held stationary and there is inserted the real strap provided with its accessories sewn in a well-defined manner corresponding to the type of vehicle for which the winder is intended.

With the arrangement of the invention, in which the spring 28 is put under tension by acting on its central end portion, it is possible to provide the reel 4, before assembly, with a sufficient length of strap for all the models and to adjust this length at the same time as the strap is personalized by its accessories.

Owing to its design, the winder according to the invention lends itself to an automatic assembly.

Indeed, any basic assembly can be obtained with similar component parts, which reduces the number of parts in stock and renders the work involving personalized shipments unnecessary.

There is formed a sub-assembly comprising the reel 4 and the insert 5 on which there have been mounted the cam 6, the driving plate 23 and the spring 28 in the cavity of the reel 4.

The non-equipped strap S is wound round the reel 4 in ensuring that the strap passes through the opening 2 of the tubular body 1.

The balls 8, the element 10, the return spring 22 are mounted and this assembly is capped by the sub-assembly formed by the cover 18 and the detecting device 15, 16, 17.

The assembly is turned over and there is placed in position the cover 30 carrying the tension adjusting element 29, and the spring 28 is armed or put under tension by rotating the element 29 the required number of turns.

The basic winder is then terminated and may be personalized, i.e. adapted to the type of vehicle for which it is intended, when preparing the orders to be delivered.

Thus, as can be seen from the drawings, and in particular from FIG. 3, the winder according to the invention has a symmetry relative to the middle of the fixing foot 3.

What is claimed is:

1. A safety belt winder comprising a base having a tubular shape and defining an inner surface, end side walls mounted on the base, a strap-return spring device, locking means for the strap and responsive to a sudden pulling force exerted on the strap, a strap-carrying reel rotatively mounted inside the base and journalled relative to the end side walls, and rolling elements in contact with said inner surface of the base rotatively mounting the reel in the base at at least one end of the reel, said end side walls respectively carrying said strap-return spring device and said locking means.

2. A winder according to claim 1, in which the reel is of plastics material and includes a metal reel-stiffening insert, the winder further comprising a cam provided with a lateral ledge defining a cam surface which is fixed to an end of said insert, the cam having circular portions centered on a winding axis of the reel, the rolling elements being interposed between said circular portions and said inner surface of the base, the rolling elements ensuring the rotatable mounting of the corresponding end of the reel in said base.

3. A winder according to claim 2, wherein said cam comprises a locking ramp means as an extension of each circular portion of the cam, the locking ramp means functioning, in response to a sudden deceleration, to jam the rolling elements against said inner surface of the base to lock the reel against rotation.

4. A winder according to claim 2, comprising an element which is concentric with the base, is provided with ratchet teeth and defines a cage for holding the rolling elements in position; said locking means comprising a deceleration detector which is mounted on a fixed part of the winder and which has a pawl, the pawl cooperating with the ratchet teeth.

5. A winder according to claim 4, wherein the deceleration detector comprises a cup-shaped seat fixed to one of the end sides walls in such manner as to be orientable as a function of the mounting position of the winder of a vehicle, a ball being disposed in the cup and cooperating with a pivotal lever which carries the pawl.

6. A winder according to claim 4, wherein the cam has a tab and nose portions, and the element defining the cage has inwardly extending projections which cooperate with said nose portions to cause said element to be rotated by said cam, and a return spring is interposed between one of the inwardly extending projections of the element and the tab of the cam.

7. A winder according to claim 2, wherein the reel has at the end thereof opposed to the cam a cylindrical peripheral surface by which it is rotatively mounted in the base, the cylindrical surface being extended by a flange defining a barrel in which the strap-return spring is disposed.

8. A winder according to claim 7, wherein the strap return spring is secured by an inner end thereof to a member for adjusting tension connected to one of said side walls which constitutes the base at the end thereof opposed to the locking means, and the strap-return spring is secured by an outer end thereof to the periphery of the reel.

9. A winder according to claim 1, wherein the base is provided with a fixing foot which is an integral part of the base and obtained by cutting out a portion of a lateral wall of the base and bending the material of the cut-out portion.

10. A winder according to claim 9, wherein the cut out portion in the lateral wall of the base forms a passage for the strap.

11. A winder according to claim 5, wherein at least said one side wall, which closes the base adjacent to the locking means, defines openings in the form of portions of the circumference permitting the adjustment of the angular position of the side wall and consequently of the deceleration detector mounted on said side wall, fixing lugs connected to the end of the base being engaged in said openings for immobilizing the side wall in translation and in rotation with respect to said body.

12. A winder according to any one of the claims 9 to 11, wherein the end side walls closing the base are identical so that the winder has a symmetry relative to the middle of its fixing foot.

* * * * *